Sept. 26, 1950      E. F. HOLT      2,523,367

SWIVEL TYPE SPOT WELDING ELECTRODE

Filed June 15, 1949

INVENTOR.
BY Edman F. Holt
Nicholas Lange
ATTORNEY

Patented Sept. 26, 1950

2,523,367

UNITED STATES PATENT OFFICE 2,523,367

SWIVEL TYPE SPOT WELDING ELECTRODE

Edman F. Holt, Indianapolis, Ind., assignor to P. R. Mallory & Co., Inc., Indianapolis, Ind., a corporation of Delaware Application June 15, 1949, Serial No. 99,159

15 Claims. (Cl. 219—4)

This invention relates generally to electrode welding apparatus and is directed more specifically to such apparatus including means and methods for providing welding electrodes in which one part is movable with respect to another part.

It is important in many types of welding operations to have a welding electrode in which one part of the electrode is adapted or constructed to move with respect to another. This type of electrode, known as a "swivel" type of electrode, is used, for example, in spot welding wherein a heatable welding section has moving reference with respect to the shank or body portion of the electrode. This pivotal type of mounting affords an equalizing pressure on the work surface as well as a large work surface contact area.

Heretofore, such swivel or pivotable welding tips have had cooling systems whereby the coolant medium is terminated at a distance from the work face of the electrode at a point within the pivot or shank portion but at a substantial distance from the tip of the electrode. With this type of construction the heat generated in the welding operation may only be removed from the welding work face by radiation or heat conduction through the solid tip portion of the electrode and the associated shank portion of the electrode. Consequently, this type of pivotable electrode, using remote cooling of the electrode tip, usually "runs hot" and deteriorates rapidly requiring frequent dressing therefor.

By the present invention a movable welding electrode is constructed having at its pivotable joint large surface areas for proper electrical conduction, while at the same time offering means for cooling the tip by directly cooling the tip surface. To do this, without causing fluid leakage, a novel ring seal construction is provided between the electrode tip and its pivot mounting. Further, in the novel construction of the present invention, because of the tight fit of the individual components, little arcing is developed therebetween. A rubber gasket or O type ring is also used and aids to tighten the tip or cap on the ball or shank portion and thus prevents the cap portion from loosely "flopping" thereon. In addition the cap portion of the swivel electrode is adapted to be easily mounted and replaced whenever desired.

It is, therefore, an object of the present invention to provide in a swivel type of electrode having a cap and main body portion, means for efficiently cooling said cap so as to prevent overheating of such cap.

Another object of the present invention is to provide in a swivel type electrode means for minimizing leakage between the component parts of said electrode by the introduction of a novel type fluid restraining structure therebetween.

Still another object of the present invention is to provide a swivel type of electrode having separate cap and body sections and wherein coolant means may be placed in direct contact with said cap without leakage therefrom externally.

Still another object of the present invention is to provide in a swivel type electrode structure a replaceable cap rotatively mounted on a main body portion of an electrode which cap may be efficiently cooled so as to prevent "hot running" of the electrode.

Yet another object of the present invention is to provide an electrode wherein separate portions thereof are rotatably mounted with respect to each other and where these separate portions present large surface areas adjacent each other for proper electrical conduction to the tip of the electrode to provide efficient welding operation.

Other objects of the invention will be apparent from the following description and accompanying drawings taken in connection with the appended claims.

The invention accordingly comprises the features of construction, combination of elements, arrangement of parts, and methods of manufacture referred to above or which will be brought out and exemplified in the disclosure hereinafter set forth, including the illustrations in the drawings, the scope of the invention being indicated in the appended claims.

References are here made to the accompanying drawing in which.

Generally speaking, the present invention comprises a welding electrode which includes a contact head section mounted on a swivel portion on a ball portion of a main body or shank of a welding electrode. The head or tip section is pressure mounted on the ball of the shank and may be readily removed from, and replaced on, the ball when desired. Further, the ball portion of the electrode has a bore penetrating therethrough and fluid coolant means inserted within the bore. Thus, when the cap is fitted on the ball, the coolant means is placed in intimate and direct contact with the cap so that it may be efficiently cooled and maintained at a cool temperature during welding operations. A groove is cut at a determined angle between the cap and ball sections of the electrode and a fluid retaining ring inserted therein between said cap and said ball. This retaining ring prevents leakage of the coolant means externally of the cap and ball and, in addition, aids in pressure fitting the cap to the ball section of the electrode.

Figure 1:
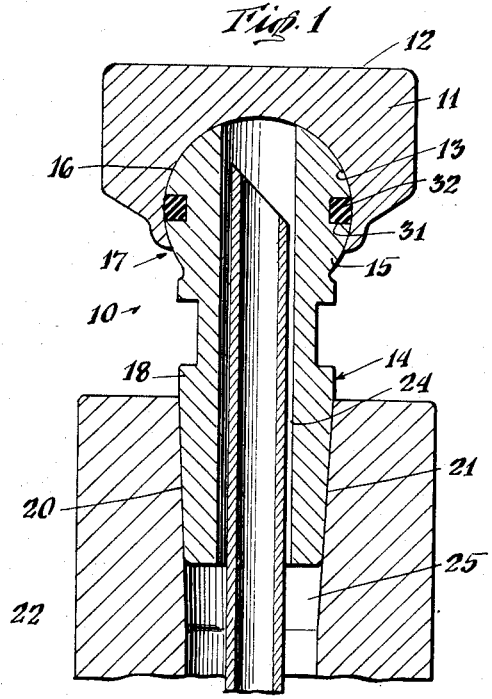
Figure 1 is a longitudinal cross section view of an embodiment of the invention disclosing the rotatable mounting of a cap upon the ball surface of the main body of an electrode having means for preventing leakage of the coolant fluid therefrom.

Referring now to Figure 1, there is shown a swivel type electrode generally represented by reference numeral 10 comprising a tip or cap portion 11 which may be formed of any material suitable for conducting electricity, and which has a work or contact face 12 adapted to serve as a welding work face. Oppositely disposed therefrom, the cap 11 has an arcuately shaped inside surface or face 13. Inside face or surface 13 may be mounted on shank 14 of electrode 10 as by means of a ball end section 15 joined integrally with shank 14. Ball 15 has a surface 16 adapted to be placed adjacent face 13 of the tip 11 to fit therein in a snug, mating relationship so as to substantially form a ball and socket joint 17. Shank 14 has an end section 18 having tapered side walls 20 and 21 adapted to form a tapered frictional connection with adaptor or welding electrode holder 22.

Figure 2:
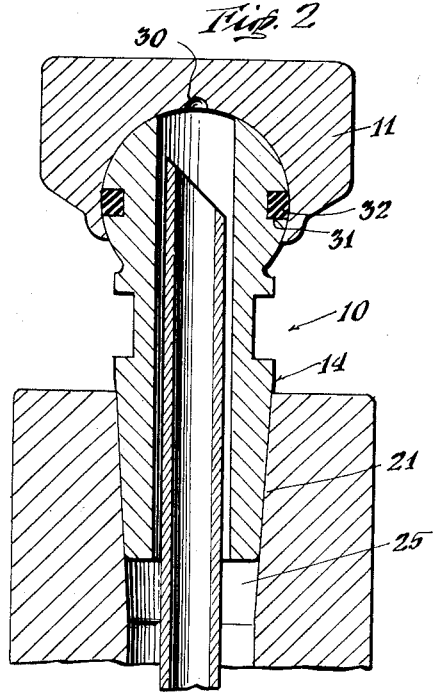
Figure 2 is a longitudinal cross section view of the swivel type electrode of the present invention showing a modification of the structure of Figure 1 wherein a recess is included within the cap portion of the electrode.
Figure 3:
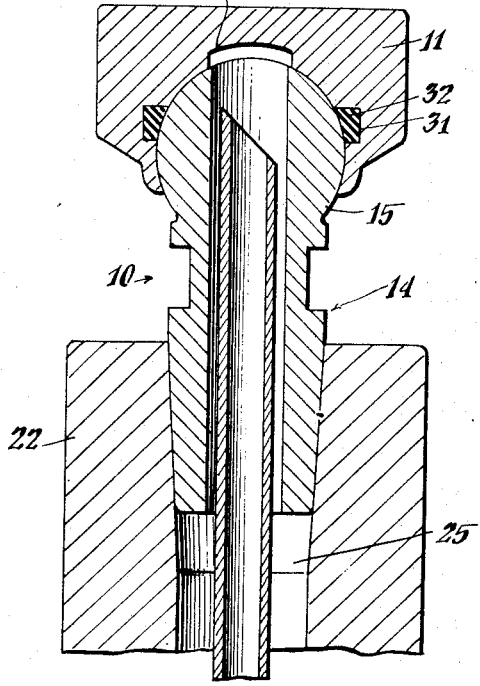
Figures 3 and 4 are longitudinal cross section views of embodiments of the invention showing modified structure for placing the ring seal used therein to prevent leakage between component parts of the electrode.
Figure 4:
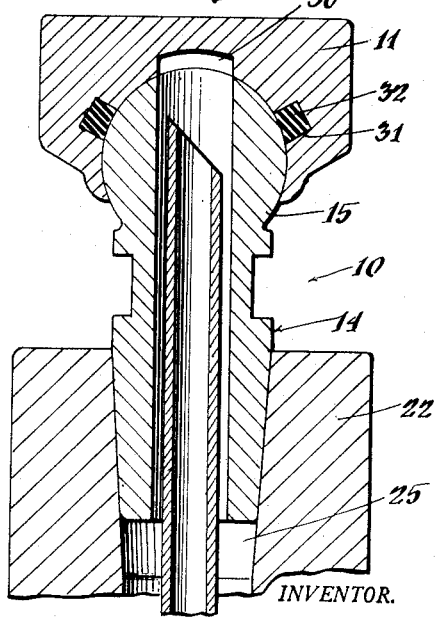

The entire shank portion 14 and ball 15 has a bore 24 substantially centrally cut therethrough, which bore penetrates the surface 16 of ball 15 and is terminated against surface 13 of cap 11. Bore 15 is cooperatively connected through end section 18 with a bore 26 similarly cut in adaptor 22. A tube adapted to conduct a coolant fluid and made of a suitable material is carried within bores 26 and 24 so that said fluid is enabled to make direct contact with the inside tip surface 13 of cap 11. As shown in Figures 2–4, in order to aid in the cooling of tip section 11 a recess 30 may be found formed within cap section 11 to aid in the cooling of cap 11.

To prevent external leakage of the coolant fluid between ball 15 and tip 11, which fluid may be under pressure, a novel sealing means is provided. A groove 31 is cut between adjacent surfaces 13 and 16 of tip 11 and ball 15, respectively. As shown in Figure 1, this groove may be cut either in the ball section 15 or as shown in Figures 2–4 in the tip portion of the electrode at an angle as desired (Figure 4). In groove 30 a fluid retaining means forming a yieldable seal type of structure, such as a rubber or fiber washer, is placed.

In the construction of the swivel type electrode, herein above described, the electrode tip is pressure mounted on ball 15, as by peening, and the fluid retaining seal which includes rubber washer 32, in addition to preventing external leakage, cooperates in the pressure mounting so as to aid in the retention of the cap on the ball. Further, the cap section is crimped in such a manner that it may be easily removed from the ball and replaced as desired.

The novel type movable electrode tip having coolant properties and fluid retention means as herein described is purely illustrative and since many wide varying modifications of the structure shown here may be made, it is intended that all such matter be covered by the present description and the appended claims.

What is claimed is:

1. A welding electrode comprising in combination a cap portion having a working face and an inside face, a main body portion of said electrode, a ball formed on said main body portion of said electrode, said ball adapted to mate with the inside face of said cap portion, said cap portion being maintained thereupon by pressure means and adapted to slideably move on said ball of said electrode, and bore means penetrating said ball to provide coolant means in direct contact with said inside face of said cap portion of said electrode for properly cooling said cap portion.

2. A welding electrode comprising in combination a cap portion having a working contact face and an inside face oppositely disposed therefrom, a main body portion of said electrode, a second face formed on said main body portion of said electrode adapted to mate with said inside face of said cap, said cap being maintained thereagainst by pressure means and said cap slideably movable thereupon, means penetrating said face of said main body portion of said electrode for providing fluid coolant therethrough, said coolant making direct contact thereby with said cap portion of said electrode for properly cooling said cap portion.

3. A welding electrode comprising in combination a cap having a working contact face and an inside curved face, a main body portion of said electrode, a ball formed at the end of said main body portion of said electrode, said ball and inside curved face of said cap comprising a socket joint whereby said cap is free to move on said ball of said main body portion of said electrode, coolant means penetrating said ball of said electrode making direct contact with said cap portion thereof, a groove formed between said cap and said ball portions adapted to receive fluid sealing means for preventing leakage from said coolant means in direct contact with said cap portion.

4. A welding electrode comprising in combination a cap having a working contact face and an inside face oppositely disposed therefrom, a main body portion of said electrode, means for pivotally mounting said cap upon said main body portion of said electrode and means cut through said main body portion for bringing coolant fluid directly to the inside face of said cap whereby said cap is cooled so as to prevent said work contact face from running hot.

5. A welding electrode comprising in combination a cap having an outside work face and an inside curved face, a main body portion of said electrode, a ball formed thereupon, said ball adapted to mate with said inside face of said cap, a groove formed in the ball of said electrode forming a space between said ball and said cap, and means placed within said space formed by said groove to aid in tightening said cap on said ball.

6. A welding electrode comprising in combination a cap portion and having a working face, an oppositely disposed inside curved face, a main body portion of said electrode, a ball mounting for said inside curved face formed on said main body portion of said electrode, said ball adapted to move within said inside curved face of said cap, groove means formed between said inside face and said ball, fluid conduit means passing through said ball making direct contact with said cap portion of said electrode and means interposed in said groove between said curved face of said cap and said ball to prevent leakage of fluid therebetween.

7. A welding electrode comprising in combination a cap portion having an inside face, a main body portion of said electrode, a pivot joint formed at the end of said main body portion of said electrode, said pivot adapted to movably support said inside face of said cap, means for pressure fitting said cap on said pivot, a groove having a desired angle formed between said cap and said pivot, coolant means penetrating said pivot and making direct contact with said cap and means placed within said groove to prevent leakage from said coolant means externally of said cap.

8. A welding electrode comprising in combination a cap portion having a work contact face and an arcuate face oppositely disposed therefrom, a main body portion of said electrode, a ball section formed on said main body portion of said electrode and having a bore penetrating therethrough, said ball adapted to cooperate with said inside face of said cap to form a pivotable mounting for said cap on said ball, a groove formed between said cap and said ball, and pressure aiding sealing means placed in said groove.

9. A welding electrode comprising in combination a cap portion having a work contact face, an inside curved surface, a main body portion of said electrode, a ball section connected to said main body portion, said ball section adapted to mate with said adjacent inside surface of said cap to provide movement between said cap and said ball, a groove formed between said cap and said ball, coolant means penetrating said ball and adjacent said inside surface of said cap, means inserted in said groove between said cap and said ball to prevent leakage between said cap and said ball externally therefrom, and a recess formed in said cap adapted to aid the conduction of said coolant to said cap so as to maintain proper cooling thereof.

10. A welding electrode comprising in combination a cap having a contact face and an inside curved face, a main body section of said electrode, a ball section formed on said main body portion of said electrode, said ball and said inside face comprising a swivel joint for moving said cap upon said ball as desired, a channel formed through said body portion and said ball, said channel making intimate contact with said inside face of said cap, said cap having a recess formed therein at a point opposite said channel in said ball, and coolant means in said channel next said recess for properly cooling said cap.

11. A welding electrode comprising in combination a cap having a work face and an inside face, a ball section formed adjacent said inside face to maintain said cap in replaceable and movable relationship therewith, means for pressure mounting said cap on said ball, coolant means through said ball and making direct contact with said cap, said cap including a recess arranged so as to aid said coolant means to properly maintain said cap at a cool temperature.

12. A welding electrode comprising in combination a cap portion having a working contact face and an inside surface oppositely disposed therefrom, a ball mating with said inside face, said ball having a channel centrally bored therethrough, a recess formed in said inside face opposite said bore, coolant means in said channel of said ball allowing a coolant fluid to make contact with said recess in said inside face, means for pressure mounting said cap on said ball, said latter means including a rubber gasket interposed between said cap and said ball and also including a crimped collar connected to said cap in tight conformity with a portion of said ball.

13. A welding electrode comprising in combination a cap having a work face and an inside face oppositely disposed therefrom, a ball adapted to mate with said inside face whereby said cap is movable on said ball, means replaceably mounting said cap on said ball, said means including an extension connected to said cap and crimped in intimate conformity with said ball, a channel centrally bored through said ball, a recess formed opposite said bore in said cap, and coolant means placed in said channel near said inside recess whereby said cap is maintained at a cool temperature during welding operations.

14. A welding electrode comprising in combination a cap having a work face and an oppositely disposed inside arcuate shaped face, a main body portion of said electrode, a curved surface formed on a main body portion of said electrode, said curved surface of said body portion conforming with said inside surface of said cap portion to form a swivel joint for moving said cap on said curved surface of said body portion of said electrode, a groove interposed between said cap and said curved surface of said body portion, a recess formed in said cap, a bore penetrating said curved surface of said main body portion of said electrode, coolant means making contact with said recess through said bore of said curved surface and sealing means in said groove adapted to prevent leakage between said curved surface of said main body portion and said cap mounted thereupon and adapted to prevent leakage of coolant.

15. A welding electrode comprising in combination a cap portion having a work contact face and an inside curved surface oppositely disposed therefrom, a main body portion of said electrode, a curved surface formed as an end of said main body portion of said electrode, said curved surface adapted to mate with said inside face of said cap portion to form a swivel joint whereby said cap is made movable with respect to said curved surface, coolant means penetrating said curved surface making direct contact with said cap, an angulated groove interposed between said cap and said curved surface, fluid preventive means inside said groove between said cap and said curved surface in order to prevent leakage of coolant between said cap and said surface externally thereof and said inside face of said cap having a recess formed therein adapted to cooperate with said coolant means in maintaining said cap at a cool temperature.

EDMAN F. HOLT.

REFERENCES CITED

The following references are of record in the file of this patent:

UNITED STATES PATENTS

| Number | Name | Date |
|---|---|---|
| 1,096,205 | Taylor | May 12, 1914 |
| 2,179,693 | Goldstein | Nov. 14, 1939 |
| 2,479,547 | Wersler et al. | Aug. 16, 1949 |